United States Patent [19]
Akashi

[11] 4,334,609
[45] Jun. 15, 1982

[54] CHAIN MECHANISM

[76] Inventor: Keiichi Akashi, Toyonaka, Japan

[21] Appl. No.: 100,149

[22] Filed: Dec. 4, 1979

[30] Foreign Application Priority Data

Dec. 30, 1978 [JP] Japan .................................. 53-164000
Apr. 1, 1979 [JP] Japan .............................. 54-42553[U]

[51] Int. Cl.³ ............................................ B65G 17/16
[52] U.S. Cl. .................................... 198/797; 198/799;
312/134; 312/268; 474/206
[58] Field of Search ................ 198/797, 799; 312/134,
312/267, 268; 474/206

[56] References Cited

U.S. PATENT DOCUMENTS

| 3,424,321 | 1/1969 | Lichti | 198/797 |
| 3,893,741 | 7/1975 | Schick | 198/797 |
| 4,037,715 | 7/1977 | Onishi et al. | 198/799 |

FOREIGN PATENT DOCUMENTS 49-24625 6/1974 Japan ................................... 198/797

Primary Examiner—Joseph E. Valenza
Attorney, Agent, or Firm—Birch, Stewart, Kolasch & Birch

[57] ABSTRACT

A chain mechanism composed of a main chain provided with triangular links disposed at a certain pitch interval and formed with a pivot apart from the joints of the chain and an auxiliary chain having the same pitch and pitch number as the main chain and provided with triangular links which are arranged in opposite relationship to the triangular links of the main chain and formed with a pivot located identically to the triangular links of the main chain, the joints and pivots of both chains being coupled through coupling links and support links which are equal in effective length. The main chain, auxiliary chain, support links and coupling links can form an associated continuous parallel crank mechanism cooperatively and therefore, the support links as well as coupling links maintain a predetermined angle throughout the path of the chain mechanism.

8 Claims, 19 Drawing Figures

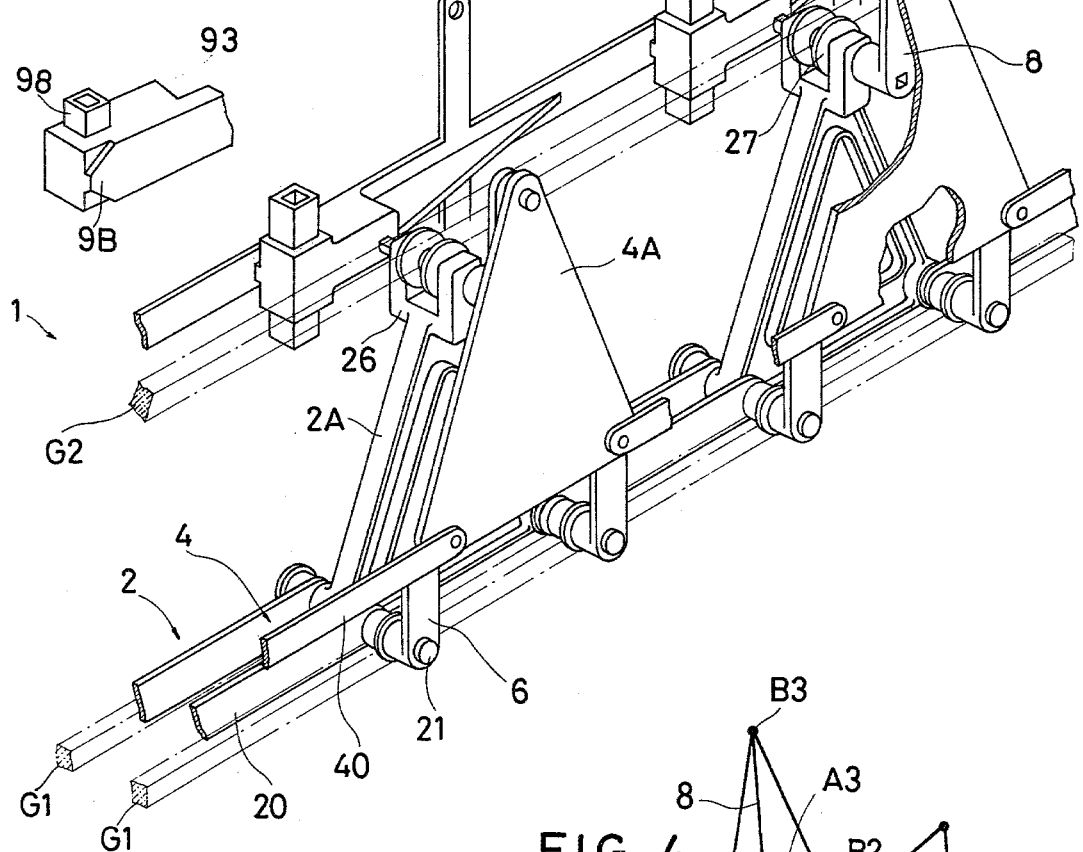
FIG. 1
FIG. 2
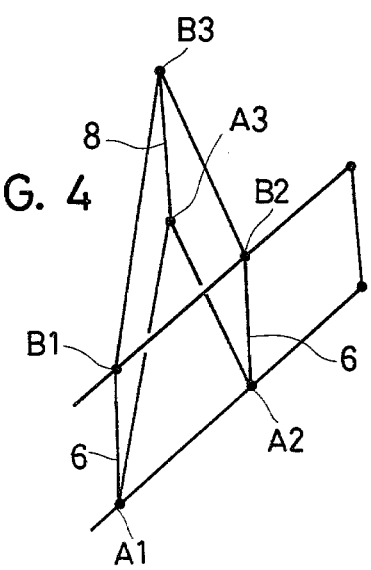
FIG. 4

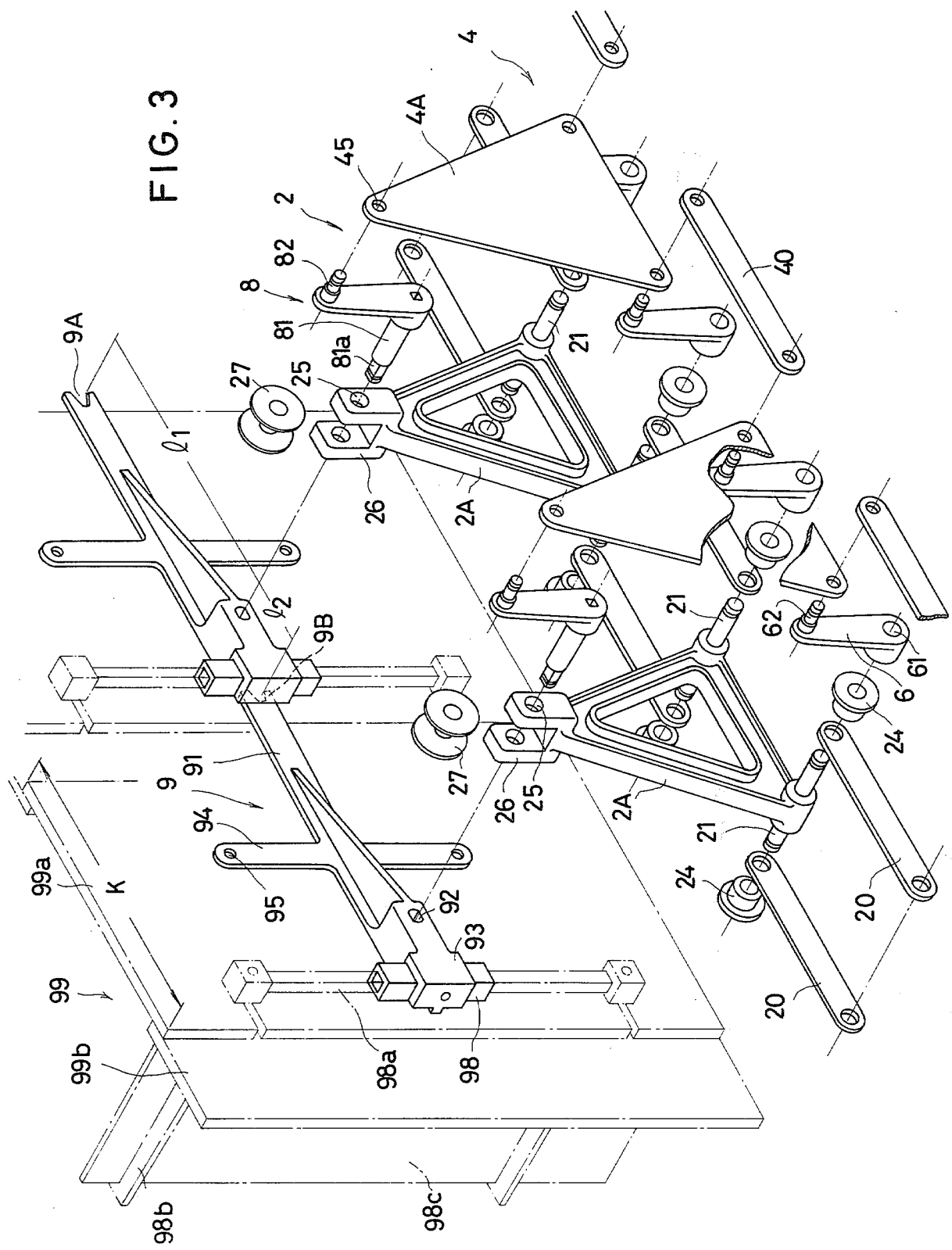

CHAIN MECHANISM

SUMMARY AND OBJECTS OF THE INVENTION

This invention relates to an improved chain mechanism, and has for an object thereof the provision of a new and improved chain mechanism.

Another object of the invention is to provide a chain mechanism which may be utilized in a showcase, display rack, conveyor or the like, wherein a carriage is circulated and maintained at a predetermined angle with respect to the horizontal plane.

A further object of the invention is to provide a chain mechanism which is excellent in rigidity due to an associated parallel crank mechanism.

Other features of the invention will be described in detail hereinunder with reference to the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a partially cutaway view in perspective of a preferred embodiment of the invention;

FIG. 2 is a fragmentary perspective view showing a rear side of an attitude maintaining device;

FIG. 3 is an exploded perspective view partially broken away of the embodiment of FIG. 1;

FIG. 4 is a perspective schematic diagram showing the link arrangement of the chain mechanism of the invention;

DETAILED DESCRIPTION OF THE INVENTION

Figure 5:
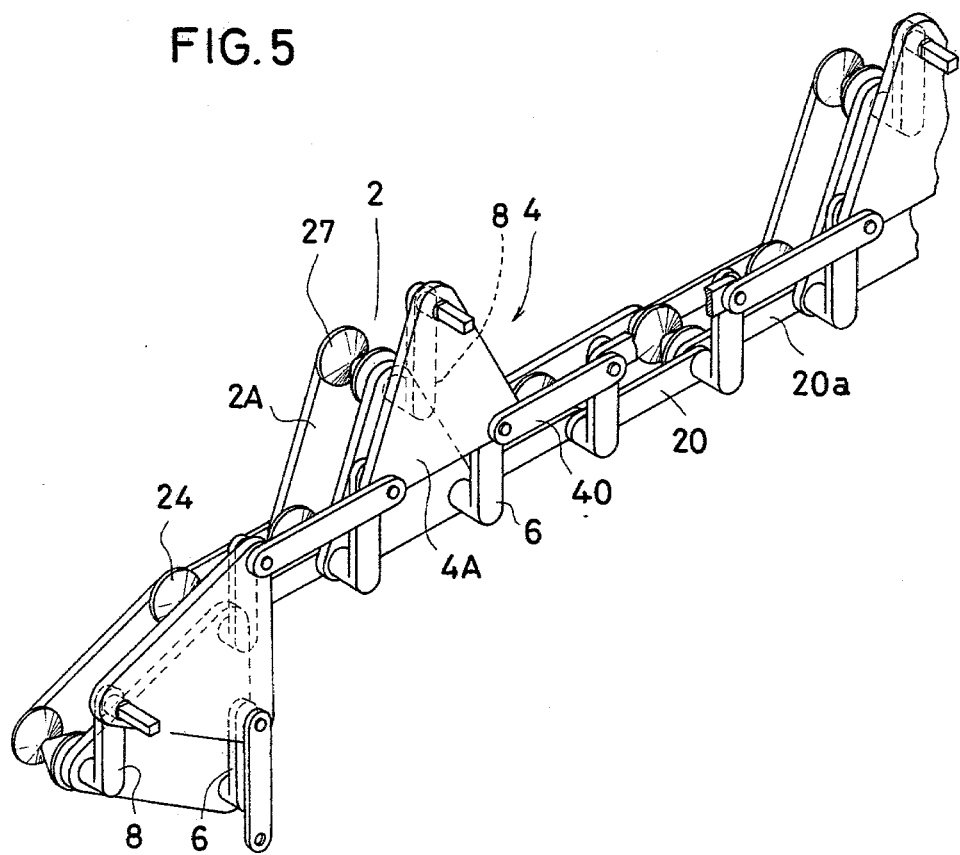
FIG. 5 is a fragmentary perspective view partly broken away of a modified embodiment of the invention.

A chain mechanism forming one specific embodiment of the invention includes a main chain 2 and an auxiliary chain 4 having the same pitch and pitch number as the main chain 2 and being disposed in side by side relationship therewith. The main chain 2 is provided with a plurality of isoscles triangular links 2A which are arranged at two pitch intervals and are equipped with two joint pins 21 projecting from both sides at their bottom corners thereof and a plurality of outer links 20 pivoted on the joint pins 21. In addition, rollers 24 are provided with a flange being mounted rotatably on the joint pins 21 outside of the outer links 20. Also, the triangular links 2A are formed with U-shaped portions 26 at the other corner thereof having a pivot hole 25. The joint pins 21 and pivot hole 25 cooperatively form a triangle. On the other hand, the auxiliary chain 4 includes outer links 40 and triangular links 4A disposed in opposite relation to the links 2A and formed with a pivot hole 45 at an identical position to the triangular link 2A. The outer link 40 and the triangular link 4A are jointed together by a joint pin 62 secured to a coupling link 6 having a through hole 61 formed at the other end thereof and paralleled to the joint pin 62, through which the joint pin 62 is inserted, with the result that the main chain 2, auxiliary chain 4 and the coupling links 6 cooperatively form a continuous parallel crank mechanism.

Additionally, since the triangular links 2A and 4A are coupled together by a support link 8 having the same effective length as the coupling link 6, a support rod 81, formed with a cut-off portion 81a at the end thereof, which is put into the pivot hole 25 and a connect pin 82 projecting in the contrary direction to the support rod 81 and being inserted into the pivot hole 45, a supplemental parallel crank mechanism is provided which is composed of the links 6 and 8 and the legs of the triangular links 2A and 4A being arranged in addition to the beforesaid basic parallel crank mechanism.

The parallel crank mechanisms are shown in FIG. 4 in union, in which each joint of the main chain 2 and the auxiliary chain 4 are designated as A1, A1, B1 and B2 respectively and the pivots 25 and 45 are called A3 and B3, for simplification of the following description.

Since the joints A1 and A2, and the pivot A3, the joints B1 and B2 and the pivot B3 are jointed together through the associated parallel crank mechanism, with the deformation or inclination of the chains mechanism, the lines A1 B1, A2 B2 and A3 B3, i.e. the links 6 and 8 are maintained in parallel orientation. Further, the inclination of the lines A1 B1, A2 B2 and A3 B3 (links 6 and 8) is maintained throughout the chain because the chains 2 and 4 are connected togeter by the continuous parallel crank mechanism. Therefore, when at least one link 6 or 8 is tilted at a predetermined angle with respect to the horizontal plane, the tiltation is transferred to the other links 6 and 8, whereby all the links 6 and 8 are simultaneously kept at the same angle. As evident by those skilled in the art, the rigidity and stability of the chain mechanism of the invention is remarkably increased due to the supplemental parallel crank mechanism formed with the links 2A, 4B and 8.

As shown in FIGS. 1, 3, 8, 9 and 10, an attitude maintaining device 9 composed of a longitudinal bar 91 and a lateral bar 94 crossed therewith is so fixed to the support rod 81, with insertion of the cut-off portion 81a into a corresponding hole 92 of the abutment 93, that the longitudinal bar 91 is directed in the same direction as the longitudinal axis of the chains 2 and 4 (at right angles to the support link 8). The lateral bar 94 is provided with threaded holes 95 for fixing the back board 99 and the longitudinal bar 91 is formed with a V-shaped groove 9A at the upper end and a V-shaped projection 9B located at the other rear side thereof. The distance $1_1$ between the hole 92 and the groove 9A is larger than the distance $1_2$ between the hole 92 and the projection 9B, and two pitches are arranged along the total distance $1_1 + 1_2$. Consequently, when the center distance of two sprockets 12a and 12b (shown in FIGS. 8, 9 and 10) is longer than the length of four pitches, at least one groove 9A can be engageable with the projection 9B of an adjacent attitude maintaining device 9 during the straight portion of the path of the chain.

A pipe 98 shown in square cross section is inserted within an opening through an abutment 93 and is parallel to the lateral bar 94. The rod 98a includes shelf supports 98b to which a shelf 98c is secured as shown in phantom line. The back board 99 secured on the lateral bar 94 is composed of a base board 99a, the longitudinal length K thereof being less than two chain pitches, and a shield board 99b which can screen the gap g between the base boards 99a running along the straight path. The back boards are disposed respectively in two different planes X and Y (not shown in FIGS. 8 and 10 but shown in FIG. 9 for simplification of the drawing) which are parallel with each other and spaced a small distance in order to prevent mutual interference. This arrangement permits the width W of the back board 99 to be constructed as wide as possible (decreasing the space L between the boards 99 running along forward and return path) without interference therebetween, even as the back board 99 travels around the sprockets 12a and 12b, as shown in FIGS. 16, 17, 18 and 19.

Figure 6:
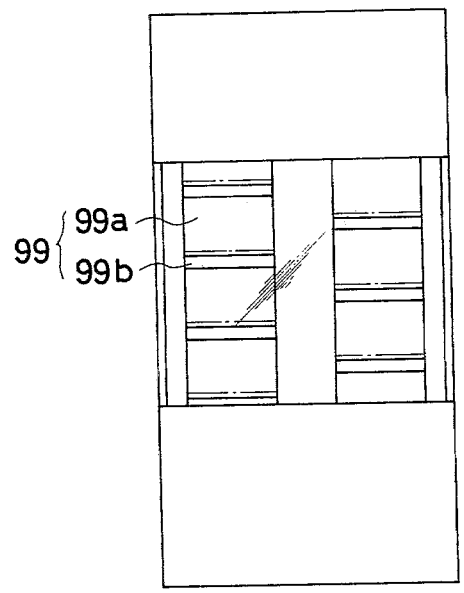
FIGS. 6 and 7 respectively, are front and side views of a showcase utilizing the chain mechanism of the invention.
Figure 7:
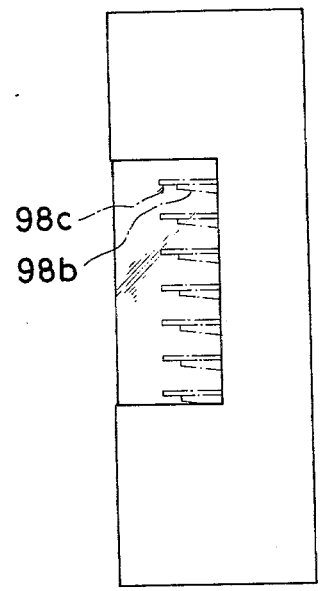
Figure 8:
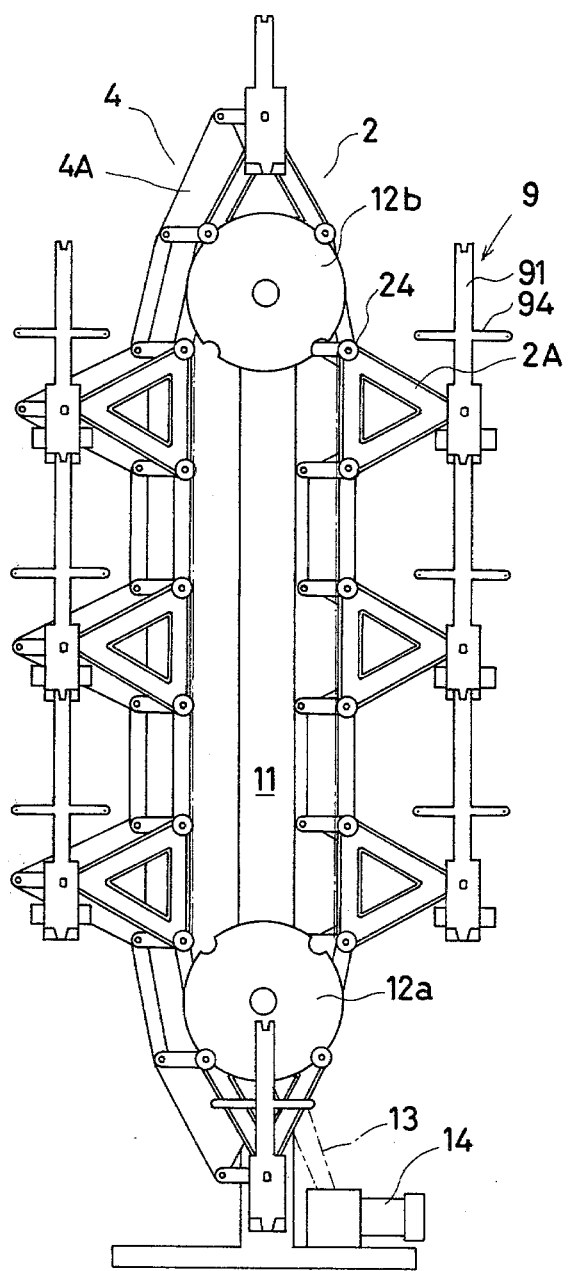
FIGS. 8, 9 and 10 respectively, are front, side and rear elevations of the drive system contained in the showcase of FIGS. 6 and 7.
Figure 10:
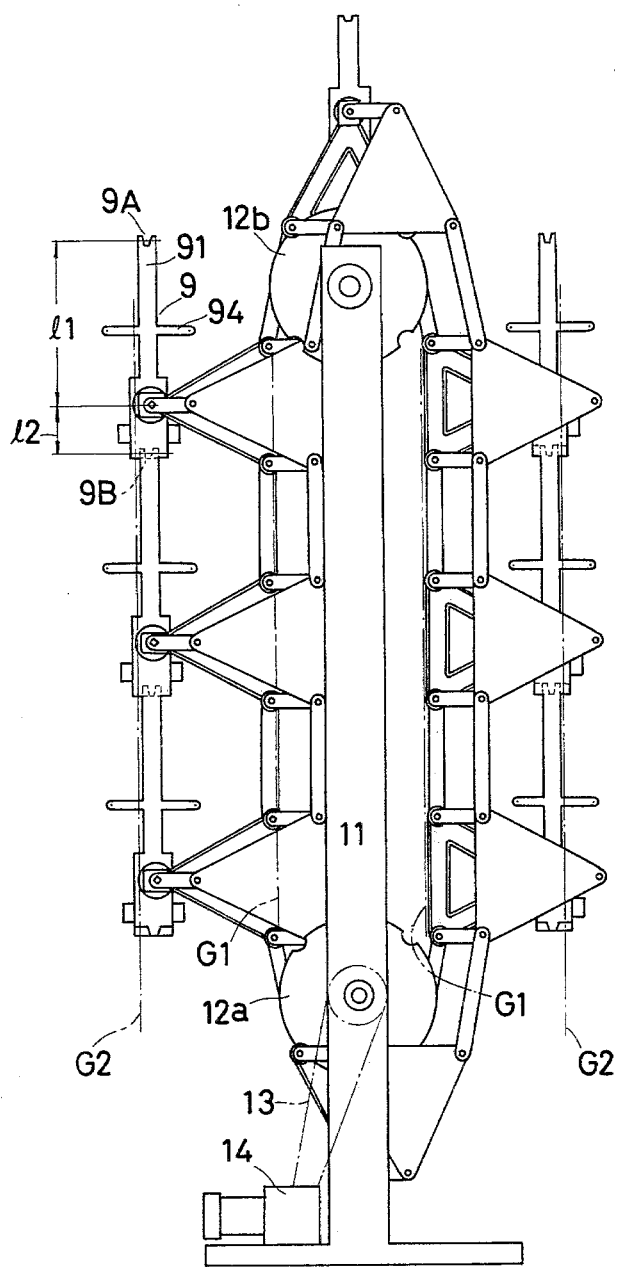
Figure 9:
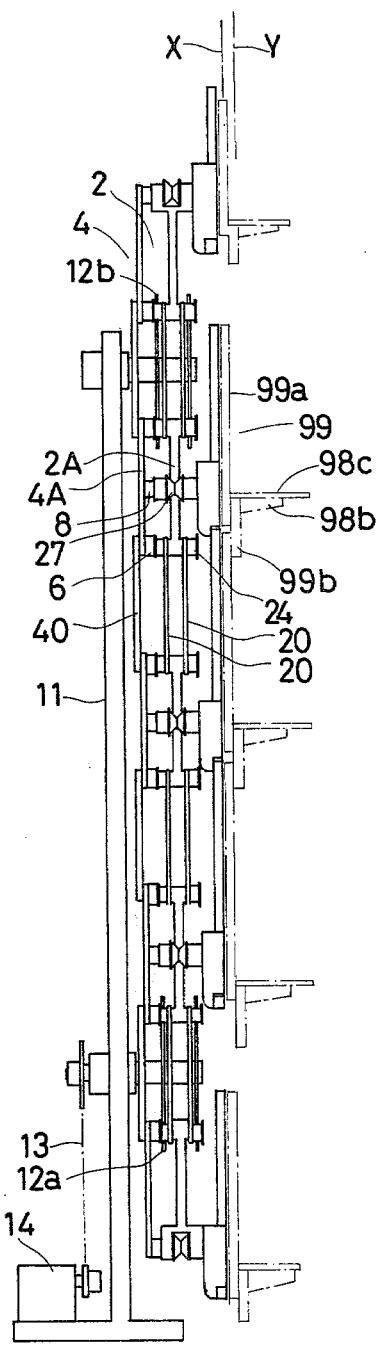

FIGS. 8, 9 and 10 show a preferred example of the invention adopted in the drive system of a showcase illustrated in FIGS. 6 and 7. In the system, the main chain 2 of the invention is wound around drive and idler sprockets 12a and 12b which are mounted rotatably on a column 11, the drive sprocket 12a being driven through a chain transmission 13 by a geared motor 14. The sprockets 12a and 12b, in the example, consists of two spaced plates having four teeth meshing with the rollers 24 disposed on both sides of the main chain 2. The rollers 24 are guided along the guide plate G1 (shown in chain line in FIGS. 1 and 10) and are parallel and spaced from each other and extending between two sprockets 12a and 12b. The rollers 27 located in the U-shaped portion 26 of the main chain 2 are also guided by the guide plate G2 which is spaced from the guide G1, whereby the main chain 2 positioned therebetween is prevented from deviation as it is conveyed along the guides G1 and G2.

Figure 11:
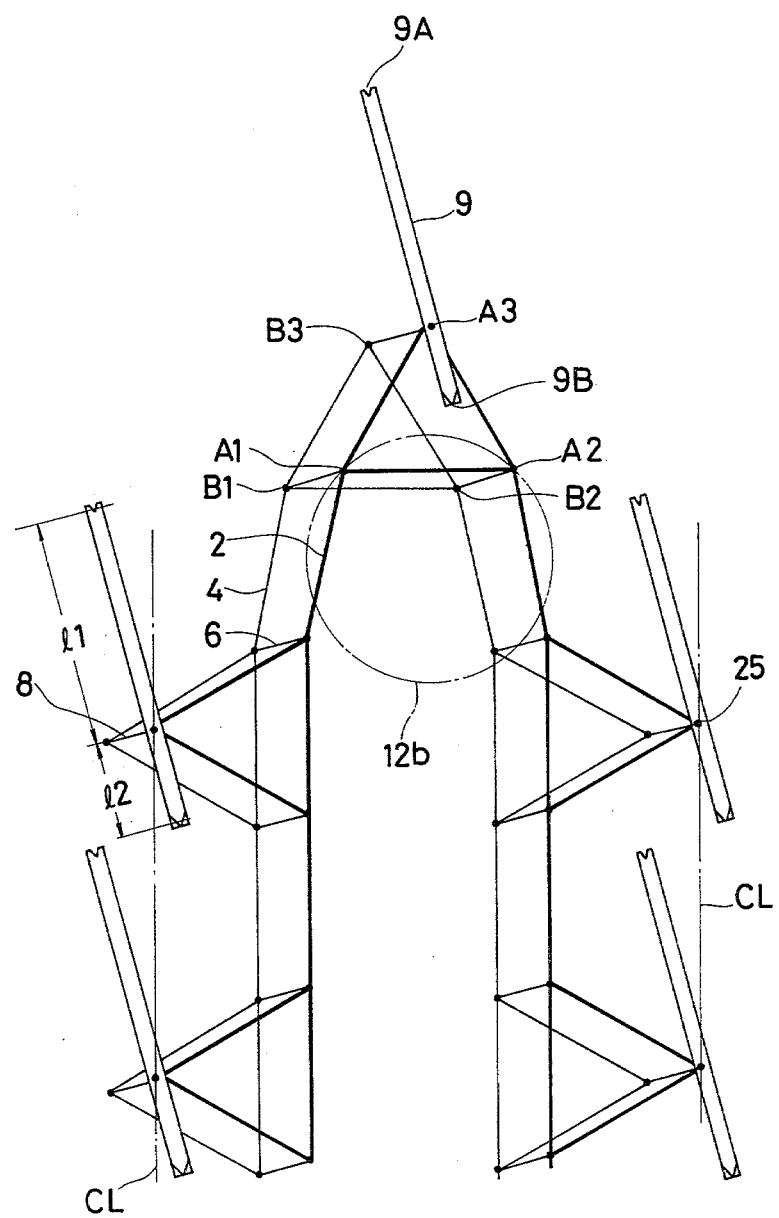
FIGS. 11, 12, 13, 14 and 15 are schematic diagrams showing the operation of the drive system shown in FIGS. 8, 9 and 10.
Figure 12:
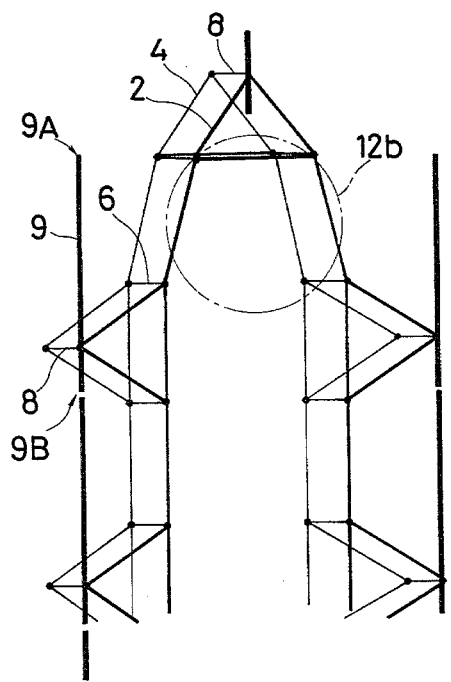
Figure 13:
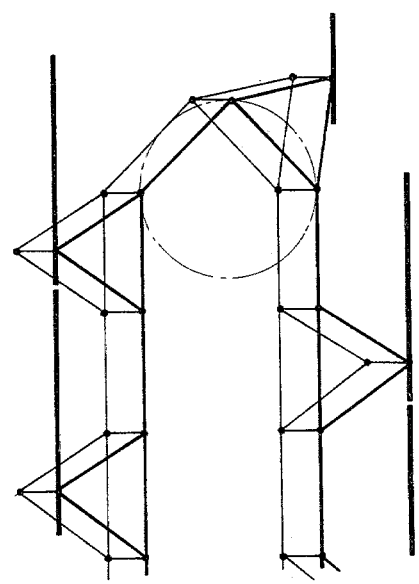
Figure 14:
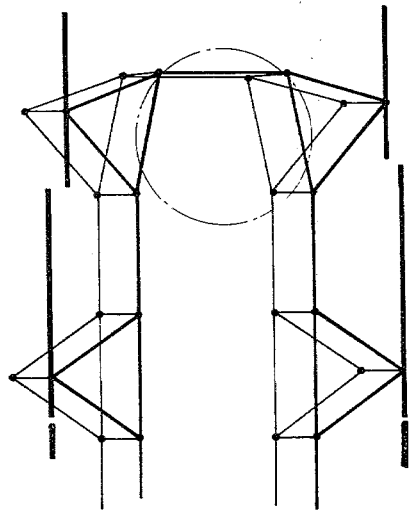
Figure 15:
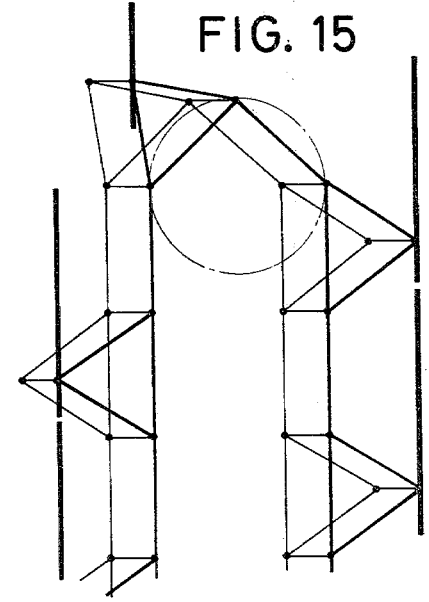
Figure 16:
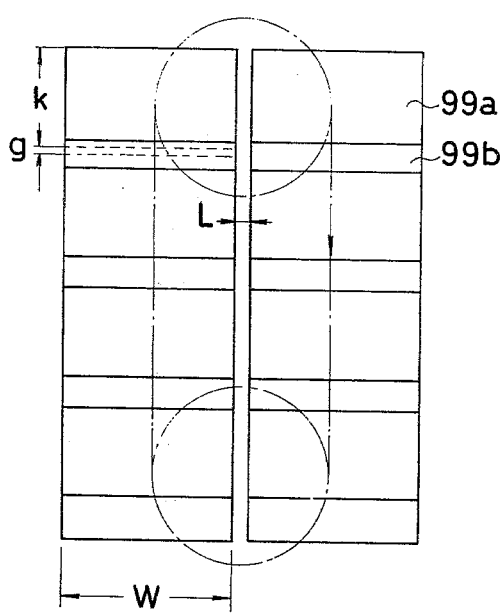
FIGS. 16, 17, 18 and 19 are schematic diagrams showing the movement of the back board of the showcase of FIGS. 6 and 7.
Figure 17:
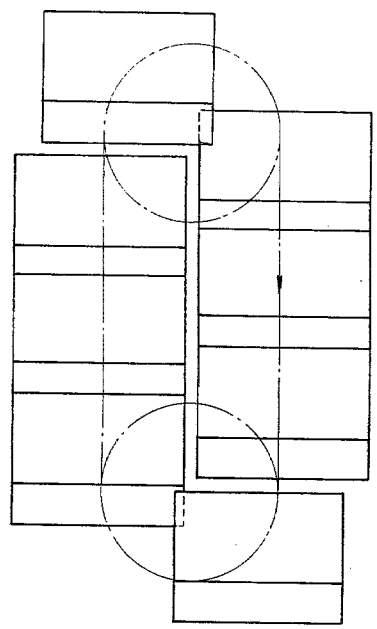
Figure 18:
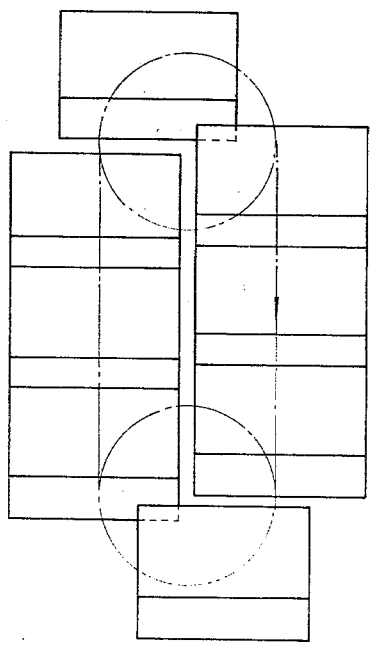
Figure 19:
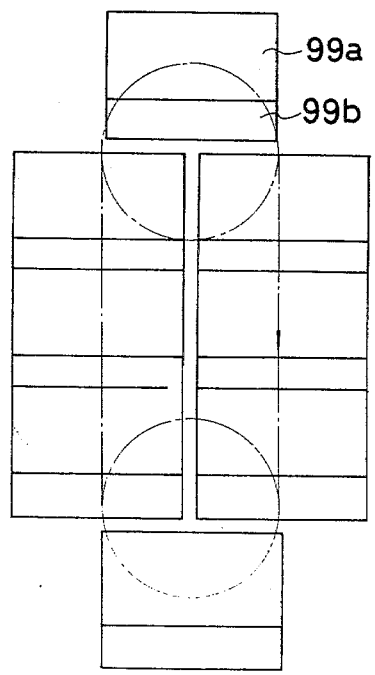

The manner of operation of the drive system will be explained with reference to the schematic diagrams in FIGS. 11, 12, 13, and 15, in which the lines jointing the joints A1 and A2 and the pivot A3 of the main chain 2 and the lines jointing the joints B1 and B2 and the pivot B3 of the auxiliary chain 4 are illustrated with thick line and fine line respectively. In the case where the V-shaped groove 9A is free from the V-shaped projection 9B, the coupling link 6 and support link 8 as well as the attitude maintaining device 9 are rotatable simultaneously at the same angle and is the same direction, due to the parallel crank mechanism as shown in FIG. 11. The displacement of the groove 9A from the center line CL jointing the center of the pivot holes 25 is larger than the displacement of the projection 9B and the direction of deviation is opposite to each other. However, with the engagement of the groove 9A in projection 9B, the longitudinal bar 91 of the attitude maintaining device 9 is aligned therewith at right angles to the links 6 and 8 and therefore, the links 6 and 8 are compelled to be maintained in a parallel arrangement. Still further, the aligning function of the attitude maintaining device 9, due to the continuous parallel crank mechanism, is transferred throughout the path of the chains 2 and 4, thereby all the links 6 and 8 as well as the shelves 98C are kept at a predetermined angle (horizontal in the embodiment).

FIG. 5 illustrates a modified embodiment of the invention in which the triangular links 2A and 4A are disposed at interval of two and four pitches reciprocally and the chain mechanism consists of a plurality of outer links 20, and inner links 20a being jointed to each other by the joint pin pivoting rollers 24 thereon and an auxiliary chain 4 which is similar to the chain 4 in the foregoing embodiment.

As described above, since the chain mechanism of the invention is composed of the main chain and the auxiliary chain connected to each other by the coupling links and each chain includes triangular links arranged in opposed relation and coupled through the additional support links, the support links and the coupling links can be disposed at predetermined angles throughout the path of the chains, when at least one link thereof is kept in a certain inclination, whereby the chain mechanism of the invention is capable of being utilized widely, such as a circulating type display rack, showcase or the like. Additionally, play on the mechanism is decreased and rigidity is highly increased due to the additional parallel crank mechanism composed of triangular links, the coupling links and the support links.

Theoretically speaking, the arrangements of the joints and pivots of the triangular link is not limited to the isosceles triangle shape a scalene triangle arrangement is also available, even if the arrangement of triangular links of chains 2 and 4 in opposed relation are identical. Further, the support rod may be extended from either joints or pivots of the links 2A or 4A.

What is claimed is:

1. A chain mechanism, comprising:
   a main chain provided with triangular links disposed at a certain pitch interval and formed with a pivot in triangular disposition cooperatively with joints thereof;
   an auxiliary chain having the same pitch and pitch number as said main chain and provided with triangular links arranged in opposite relationship to said triangular links of said main chain and formed with a pivot located identically to said triangular links of said main chain;
   said auxiliary chain consisting of said triangular links, outer links and joint pins;
   said joints of said main chain and joints of said auxiliary chain being coupled through a coupling link as well as said pivot of said main chain being coupled with said pivot of said auxiliary chain by a support link provided with a support rod for securing a carriage and having the same effective length as said coupling link;
   said triangular links of said main chain being equipped with a roller at said pivot and said roller being guided along a guide plate arranged opposite to another guide plate on which rollers positioned at said joint of said main chain are guided.

2. The chain mechanism of claim 1 wherein said support rod is equipped with an attitude maintaining device in order to orient the support rod at a predetermined angle.

3. The chain mechanism of claim 2 wherein said attitude maintaining device is formed with an engaging means at top and bottom thereof, the engaging means of adjacent attitude maintaining devices being engageable with each other in the straight path of the chain between the sprockets.

4. A chain mechanism comprising:
   a main chain including a plurality of triangular links disposed at a certain pitch and being spaced a predetermined distance from each other by a plurality of outer links, said outer links being connected to joint pins affixed to two bottom corners of said triangular links;

an auxiliary chain having the same pitch and pitch number as said main chain and including a plurality of triangular links being spaced apart by a plurality of outer links and having joints disposed at two bottom corners of said triangular links;

said triangular links of said main chain and said triangular links of said auxiliary chain including a pivot in cooperative triangular disposition with respect to said joint pins of said main chain and said joints of said auxiliary chain;

coupling links being operatively connected to said joint pins of said main chain and to corresponding joints of said auxiliary chain;

support links being operatively connected to said pivots of said main chain and said auxiliary chain, said support links including a support rod for securing a carriage, said support rod having the same effective length as said coupling link;

a plurality of rollers, one roller being operatively positioned on each of said joint pins and one roller being operatively positioned on said pivot of said triangular links of said main chain;

a guide path operatively positioned to guide said rollers positioned on said pivot, said guide plate arranged opposite another guide plate operatively positioned to guide said rollers positioned on said joint pins, said guide plates maintaining said triangular links at a predetermined angle with respect to a horizontal plane.

5. A chain mechanism according to claim 4, and further including drive and idler sprockets spaced apart relative to each other, said main chain being in engagement with said drive and idler sprockets to impart rotation thereto.

6. A chain mechanism according to claim 4, wherein an attitude maintaining device is attached to said support rod, said attitude maintaining device includes a longitudinal bar and a lateral bar, said longitudinal bar having a V-shaped groove at one end thereof and a V-shaped projection at the other end, wherein a V-shaped groove and a V-shaped projection of adjacent attitude maintaining devices being adapted to mate with each other.

7. A chain mechanism according to claim 6, wherein a back board is secured on said lateral bar and includes a base board having a length being less than two chain pitches and a shield board mounted on said base board to shield a gap formed between adjacent base boards.

8. A chain mechanism according to claim 4, wherein said coupling links and said support links mount said auxiliary chain in a position which is displaced away from said main chain.

* * * * *